US011231379B2

(12) United States Patent
Thorne

(10) Patent No.: US 11,231,379 B2
(45) Date of Patent: Jan. 25, 2022

(54) SAMPLE CELL ARRAYS AND HARDWARE FOR HIGH-THROUGHPUT CRYOSAXS

(71) Applicant: CORNELL UNIVERSITY, Ithaca, NY (US)

(72) Inventor: Robert Thorne, Ithaca, NY (US)

(73) Assignee: CORNELL UNIVERSITY, Ithaca, NY (US)

(*) Notice: Subject to any disclaimer, the term of this patent is extended or adjusted under 35 U.S.C. 154(b) by 0 days.

(21) Appl. No.: 16/636,378

(22) PCT Filed: Aug. 6, 2018

(86) PCT No.: PCT/US2018/045356
§ 371 (c)(1),
(2) Date: Feb. 4, 2020

(87) PCT Pub. No.: WO2019/028455
PCT Pub. Date: Feb. 7, 2019

(65) Prior Publication Data
US 2020/0256811 A1 Aug. 13, 2020

Related U.S. Application Data

(60) Provisional application No. 62/541,161, filed on Aug. 4, 2017, provisional application No. 62/541,341, filed on Aug. 4, 2017.

(51) Int. Cl.
G01N 23/20025 (2018.01)
G01N 23/201 (2018.01)

(52) U.S. Cl.
CPC ..... G01N 23/20025 (2013.01); G01N 23/201 (2013.01)

(58) Field of Classification Search
CPC .......... G01N 23/20025; G01N 23/201; G01N 23/20033
See application file for complete search history.

(56) References Cited

U.S. PATENT DOCUMENTS 3,742,226 A * 6/1973 Smallbone ......... G01N 23/2204
378/47
2003/0175160 A1 9/2003 Archibald et al.
(Continued)

FOREIGN PATENT DOCUMENTS

KR 1020120124102 11/2012
WO 2013184665 12/2013

OTHER PUBLICATIONS

International Search Report and Written Opinion for International Application PCT/US2018/045356 dated Nov. 28, 2018; 13 pages.

Primary Examiner — Dani Fox
Assistant Examiner — Soorena Kefayati
(74) Attorney, Agent, or Firm — George McGuire

(57) ABSTRACT

A system and method of sample cell arrays for performing small-angle X-ray scattering on solutions containing biomolecules and/or other solutes. The sample cell array includes sample cells having a cylindrical cross-section and side walls that are thin compared with their diameter, and preferably made of a compliant material. The cylindrical cells are attached to top and bottom substrates, each with a high transmittance X-ray window, with their axis perpendicular to the respective substrate. The cells are loaded with buffer and buffer+biomolecule solution from an initially open top end. A top substrate (with a sealing cap and the X-ray window) is pushed down onto the cylindrical cells. On cooling to cryogenic temperatures, the thermal contraction of the sample relative to the sample cells does not cause large stresses to develop in the sample once it solidifies and cause sample cracking.

22 Claims, 12 Drawing Sheets

(56) References Cited

U.S. PATENT DOCUMENTS

| | | | |
|---|---|---|---|
| 2009/0028760 A1* | 1/2009 | Solazzi | G01N 23/20025 |
| | | | 422/400 |
| 2009/0133410 A1* | 5/2009 | Thorne | G01N 1/42 |
| | | | 62/62 |
| 2009/0141867 A1* | 6/2009 | Burdett, Jr. | G01N 23/2204 |
| | | | 378/208 |
| 2011/0051134 A1* | 3/2011 | Solazzi | B01L 3/508 |
| | | | 356/300 |
| 2011/0085638 A1* | 4/2011 | Kishida | G01N 23/223 |
| | | | 378/45 |
| 2013/0014528 A1* | 1/2013 | Stabacinskiene | |
| | | | G01N 23/20033 |
| | | | 62/129 |
| 2013/0259201 A1* | 10/2013 | Amenitsch | G01N 23/2204 |
| | | | 378/86 |
| 2013/0308756 A1* | 11/2013 | Bogan | H01J 49/167 |
| | | | 378/86 |
| 2015/0003580 A1* | 1/2015 | Sarrazin | G01N 23/2204 |
| | | | 378/44 |
| 2015/0051877 A1 | 2/2015 | Bakeman et al. | |
| 2015/0233804 A1* | 8/2015 | Meisberger | G01N 23/201 |
| | | | 378/53 |
| 2015/0338322 A1* | 11/2015 | Damiano, Jr. | H01J 37/00 |
| | | | 73/864.91 |
| 2016/0216218 A1* | 7/2016 | Grader | C07D 241/04 |
| 2018/0024081 A1* | 1/2018 | Kogan | G01N 23/20033 |
| | | | 378/86 |
| 2019/0195814 A1* | 6/2019 | Wogritsch | G01N 1/42 |
| 2019/0346384 A1* | 11/2019 | Matsuda | G01N 23/20025 |
| 2021/0286972 A1* | 9/2021 | Lin | G06K 9/622 |

* cited by examiner

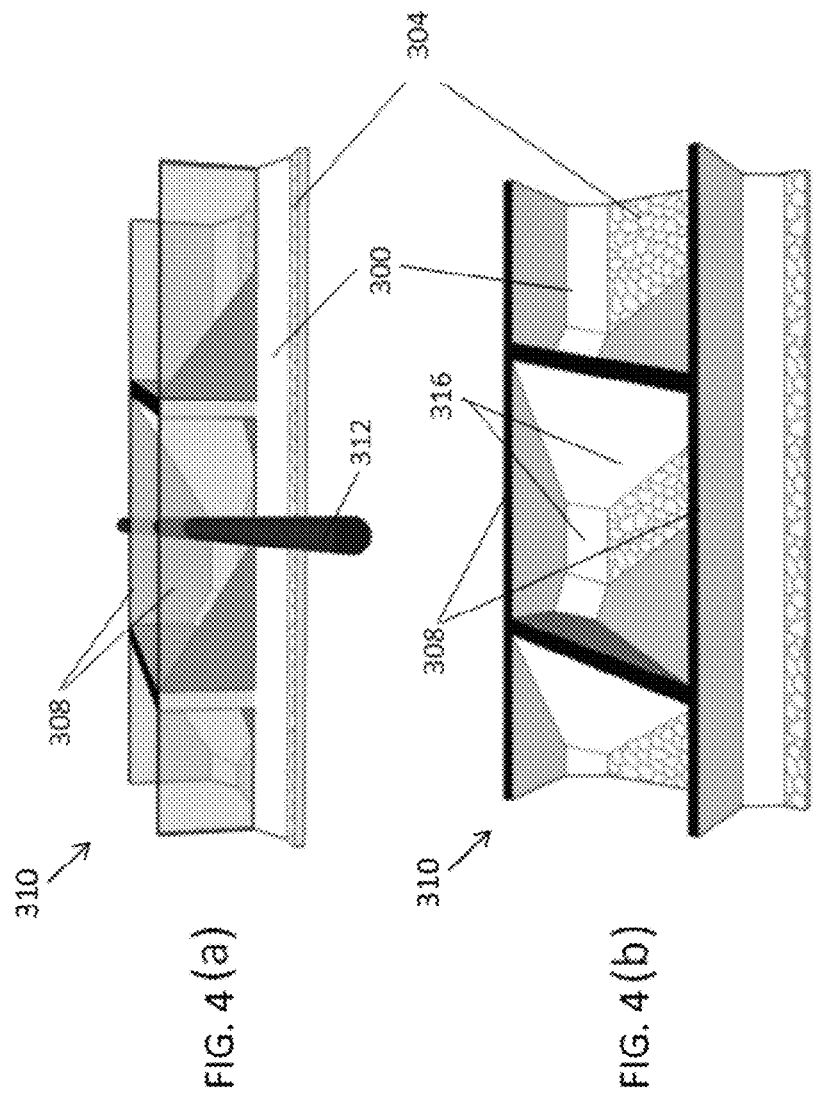

SAMPLE CELL ARRAYS AND HARDWARE FOR HIGH-THROUGHPUT CRYOSAXS

CROSS REFERENCE

This application is a U.S. National Phase filing of International Application No. PCT/US18/45356 filed Aug. 6, 2018, which claims priority to U.S. Provisional Patent Application Ser. No. 62/541,161, filed on Aug. 4, 2017 and entitled "Sample Cell Arrays and Hardware for High-Throughput Cryogenic Temperature Small-Angle X-Ray Scattering" and U.S. Provisional Patent Application Ser. No. 62/541,341, filed on Aug. 4, 2017 and entitled "Sample Cell Arrays and Hardware for High-Throughput Cryogenic Temperature Small-Angle X-Ray Scattering," the entireties of each of which are incorporated herein by reference.

GOVERNMENT FUNDING

This invention was made with Government support under Grant No. DBI-1152348 awarded by the National Science Foundation (NSF) and Grant No. 1R01GM127528 awarded by the National Institutes of Health (NIH). The United States Government has certain rights in the invention.

BACKGROUND OF THE INVENTION

1. Field of the Invention

The invention relates generally to methods, system, and apparatuses for sample holding for analysis by small-angle array scattering, and, more particularly, to methods, systems, and apparatuses for sample holding in cryogenic temperature and variable temperature small-angle X-ray scattering, in which samples and holders are cooled to cryogenic or intermediate temperatures, respectively.

2. Description of Related Art

Small Angle X-Ray Scattering as a Probe of Molecular Structure and Interactions

Small-angle X-ray scattering (SAXS) is one of the simplest, most broadly applicable and most powerful methods for probing the structure of biomolecules (e.g., proteins and nucleic acid), biomolecular complexes, viruses, and small molecule and pharmaceutical compounds. The determination of these molecular structures is critical to modern molecular biology, and to the development of pharmaceutical treatments for various diseases and human conditions. SAXS can probe interactions between molecules and molecular aggregation and the properties of the liquid in which they move, and is used to study inorganic compounds, nanoparticles, and many other systems.

In a typical SAXS experiment (shown in FIG. 1), an X-ray beam is directed at a solution containing a relatively low concentration of the biomolecule of interest, and the scattered X-ray intensity is recorded using an area detector. The biomolecules are randomly oriented so the measured X-ray scattering pattern I(q) is ensemble and spherically averaged and depends only on the magnitude of the scatter wave vector $q=4\pi \sin(\theta)/\lambda$. Azimuthal averaging of the detector's pattern gives a one-dimensional relation between scattered intensity I and q. The q dependence of I(q) is related to the Fourier transform of the electron density distribution within the biomolecule, so scattering from larger biomolecules will fall off more rapidly with q than that from smaller ones. SAXS typically involves collection and processing of scattering from $q\sim0.005$ Å$^{-1}$ to $q\sim0.5$ Å$^{-1}$ (to angles $2\theta$ of ~2°), corresponding to feature sizes $d=2\pi/q$ from ~1 to 100 nm. It thus probes overall molecular size and shape rather than the positions of the individual atoms.

From the 1950s to the 1990s, SAXS saw limited application to biomolecules because the information content of the scattering profiles I(q) profiles was assumed to be low. Scattering profiles were compared with those expected from spheres, cylinders or ellipsoids, and only crudely descriptive parameters like the molecular radius of gyration, $R_g$, could be extracted. Beginning in the 1990s, new analytical tools for rigid body modeling and ab initio shape reconstructions were developed, culminating with the release of the ATSAS package for interpreting SAXS data by Dmitri Svergun and collaborators in 2006. This package, which allowed low resolution reconstructions of biomolecular envelopes from SAXS data in a matter of hours, was transformative. Interest in SAXS from structural biologists exploded. Dedicated SAXS beamlines were constructed at most US and international synchrotron X-ray sources, and high performance laboratory bioSAXS systems became commercially available. Powerful analysis tools complementing and extending those of ATSAS were developed. Despite or because of these developments, the bottleneck in SAXS studies has shifted from data analysis and interpretation to data acquisition. Most SAXS beamlines are heavily oversubscribed. BioSAXS use by pharmaceutical companies is rapidly expanding, and many have invested in dedicated lab bioSAXS systems, in part due to the high industrial-rate cost per measurement at synchrotrons.

The tremendous appeal of bioSAXS is due to its simplicity and broad applicability. SAXS yields structural information from biomolecules and complexes in solution, without need for crystallization or labeling. It can be used to probe biostructures of any size, from RNA fragments with dimensions of order 10 Å to ribosomes and other large complexes with dimensions of order of tens of nanometers. Unlike X-ray crystallography, SAXS measures equilibrium structural properties unconstrained by crystal contacts in any solution, including solutions that promote unfolding or are otherwise unfavorable for crystallization. SAXS has an especially important role in characterizing membrane proteins, highly flexible and intrinsically disordered proteins, and other structures that are physiologically important to disease and health but cannot easily be crystallized.

Although SAXS provides low resolution (~15 Å) information about molecular structure, signal to noise is typically large and very small (~0.1 Å) changes in $R_g$ and the distribution of electrons within a molecule can be detected. SAXS can be used to study protein folding and conformational ensembles, ligand interactions, complex assembly, oligomeric heterogeneity and complex assembly, molecular crowding, and solvent structure near biomolecular surfaces.

Challenges in BioSAXS

Currently, SAXS is performed on biomolecules in solution at room temperature. Sample solutions are shipped to a synchrotron, and SAXS data collected from flowing or oscillating solution in a sample cell. To increase throughput, many beamlines have autosamplers that pipette solutions from a storage container—often a 96 well plate—into the sample cell. The most important obstacles to room-temperature SAXS data collection are obtaining adequate quantities of monodisperse, aggregate-free sample, and radiation damage. Since the scattered intensity I(q) as $q \to 0$ is proportional to square of the scattering object's molecular weight, SAXS is sensitive to biomolecular aggregation, heterogeneity, and bubbles. Radiation damage due to direct X-ray absorption and interaction with secondary electrons in both the biomolecules and buffer, and diffusion and reaction of free radicals results in H atom, side chain, and main chain cleavage, conformation changes, unfolding, fragmentation, and desolubilization. Radiation-induced aggregation (and, at high dose rates, hydrogen bubble formation) have the most dramatic effects on SAXS profiles, and even small aggregate concentrations corrupt low resolution structural data and adversely affecting molecular envelope reconstructions. Significant changes in SAXS signals can occur at doses (energy deposited per kg) as small as ~400 Gy. Biologically important targets such as metalloproteins and sensors can also exhibit fast damage at, e.g., the enzymatically important metal site, that perturb ligand interactions and associated conformation changes. Large variations in radiation sensitivity from molecule to molecule and buffer to buffer mean that dose limits must be determined on a case by case basis.

To minimize radiation doses and achieve adequate signal to noise (~10), large sample volumes must be irradiated either by defocusing the X-ray beam or by flowing or translating the sample through the beam. Typical volumes range from ~2 to 20 microliters per measurement, corresponding to ~2 to 20 micrograms of protein or more. Many samples are intrinsically heterogeneous and/or are unstable and aggregate or degrade in the days between production and synchrotron-based SAXS data collection. Heterogeneous samples can be passed through a size exclusion column immediately prior to SAXS measurement (SEC-SAXS), but sample volumes of 50-100 microliters per measurement are then needed. Many of the most interesting biological questions require series of measurements—e.g., versus pH, ionic strength, ligand concentration, or ligand type—and each experiment must be replicated, so total protein requirements can be several to tens of milligrams. At the same time, many of the most interesting targets, including membrane proteins, human proteins, and biomolecular assemblies, can be difficult to obtain in mg quantities. The large sample volumes required to minimize the effects of radiation damage have thus restricted the application of SAXS, especially in titrations and in ligand screening, to relatively abundant biomolecules.

Another issue in room-temperature SAXS is throughput. All samples and buffers are typically measured in the same cell. To completely flush each sample and remove contaminants (often radiation-damage generated) that have adhered to cell windows, sample cells must be thoroughly cleaned between measurements. Even though SAXS diffraction patterns can be collected in ~1 s, cell loading and cleaning can takes minute, so that in "high-throughput" facilities perhaps 20-50 samples can be measured per hour, corresponding to a data collection duty cycle of less than 1%. Thus, large sample volumes per measurement and long measurement times per sample are serious obstacles to high-throughput applications, in which SAXS may be most likely to lead to substantial advances in human health.

Performing SAXS Using Samples Cooled to Cryogenic Temperatures

A solution to these difficulties is to follow the lead of cryocrystallography and perform SAXS measurements on samples cooled to cryogenic temperatures. Samples could be expressed, purified, and then immediately dispensed into holders and flash cooled in the home lab, minimizing time for sample aggregation and degradation. Cryogenic samples could be stored indefinitely before measurements and would be easy to ship. During X-ray data collection, diffusion of most radiation-generated reactive species would be eliminated, and the frozen solvent matrix would prevent aggregation and fragmentation. Maximum tolerable X-ray doses would be greatly increased—to $10^7$ Gray or more. Since integrated signal-to-noise increases as the square root of the number of incident (and diffracted) photons, sample volumes required to achieve a given S/N could be decreased by a factor up to 1000. Measurements on more dilute samples (eliminating interparticle interference), on biomolecules that are not available in large quantities; and on a given molecule under a much wider range of conditions would be more feasible. As in serial cryocrystallography, arrays of cells could be placed in a gas cryostream and data collected by stepping the array across the X-ray beam. Dead times between measurements could be reduced to ~1 s or less, data collection duty cycles increased toward 50%, and beamline throughputs increased by roughly two orders of magnitude.

The combination of greatly reduced sample requirements and greatly increased throughputs would enable a broad expansion of bioSAXS, especially in applications, e.g., involving mass screening of solution conditions for effects on biomolecular structure and association, and combinatorial binding assays to elucidate pathways for macromolecular complex formation. CryoSAXS could also be useful in formulation of biologic drugs, where aggregation as a result of cryogenic storage could be directly probed in the frozen state. These benefits of cryoSAXS would be achieved without incurring the very large costs of building and equipping more synchrotron beamlines, or of scaling up expression of difficult-to-express biomolecules. Consequently, the development of reliable high-throughput cryoSAXS methods could be transformative for many applications of bioSAXS.

Challenges in CryoSAXS

The potential benefits of performing SAXS using cryogenically cooled samples have long been obvious, although at no time have these benefits been as important as they are today. Cryocooling has been used a few previous bioSAXS experiments, but data quality sufficient to extract $R_g$ values or molecular envelopes was not obtained.

In (cryo)crystallography, Bragg scattering by the ordered lattice of molecules is orders of magnitude more intense than scattering from disordered crystal solvent, the sample holder, and other background sources. Cryoprotectants are added and crystals are rapidly cooled in the hope that the solvent forms a homogeneous glass. But even ice volume fractions of ~1%, which generate intense diffraction rings and large increases in mosaicity, can be tolerated.

In SAXS, the q-dependent scattering from the biomolecule can be comparable in magnitude to that from the surrounding buffer and other background sources. Determining the biomolecule's scattering profile thus requires subtraction of the scattering profile acquired from a biomolecule-free but otherwise identical buffer sample from the profile of the biomolecule-containing sample. Buffer- and background-subtracted SAXS profiles are exquisitely sensitive to minute amounts of ice, aggregates, and other sample inhomogeneities, especially at low q values. Even ice fractions of ~$10^4$ are sufficient to introduce large errors in radii of gyration and reconstructed molecular envelopes.

Accurate background subtraction also requires that the X-ray path lengths through the sample and buffer be identical, or else that these path lengths can be accurately measured. In room temperature SAXS, the biomolecule and buffer background samples are measured in the same sample cell, ensuring illumination of the exact same volume. In cryoSAXS, the sample, buffer, and cell all contract on cooling, and sample and buffer are most conveniently measured in different cells, so that path lengths will in general differ.

Interpretation of SAXS profiles benefits from knowledge of the buffer density and the density and size of the hydration shell structure around the biomolecule. At cryogenic temperatures, these parameters are unknown. Buffers suitable for preventing ice formation on cooling while maximally preserving the biologically relevant biomolecular structure have not been explored. Finally, SAXS beamlines require careful alignment and optimization to minimize background scatter. The barrier to making required modifications for cryoSAXS experiment and sacrificing time for its development has been substantial, especially given the high demand for SAXS beam time and the absence of cryoSAXS hardware that could speed that development.

Eliminating Ice Formation

Ice nucleation and growth and final cryogenic temperature ice fractions can be reduced by adding cryoprotectants such as glycerol and ethylene glycol, and by increasing cooling rates. Required cryoprotectant concentrations to eliminate ice scattering from cryoSAXS patterns of buffers cooled to 100 K in a nitrogen gas cryostream were determined. Ice generates power law scattering $I(q) \propto q^{-\beta}$ that can be orders of magnitude larger than that of the liquid buffer at low q. At low cryoprotectant concentrations, large ice crystals form and ice scattering in the q range probed by SAXS is modest. As cryoprotectant concentration is increased, the vitrified sample fraction grows, ice crystal sizes shrink, and both optical and SAXS scattering increase. On further concentration increase, crystallites within the vitrified matrix shrink below visible wavelengths and the drops become optically clear. Eliminating excess low-q SAXS scatter requires somewhat larger cryoprotectant concentrations—45% w/w for PEG 200.

Background Subtraction in Variable Path Length Sample Cells

Sample cells used in initial experiments were cylindrical polyimide tubes, open at each end. The X-ray path length through the sample depended on the (irreproducible) injected sample volume and so was different for the biomolecule+buffer and buffer-only samples. Path lengths were normalized by measuring each sample's transmission T using detectors located upstream and downstream of the sample. Sample data and background subtraction for a 2 mg/ml glucose isomerase (GI) solution at 100 K background and buffer subtraction were determined. CryoSAXS profiles and molecular reconstructions were consistent with those determined at 300 K.

Radii of gyration for obtained from Guinier plots were 33.4±0.1 Å for GI in 45% PEG 200 buffer at 100 K, 32.5±0.1 Å for glucose isomerase in 45% PEG 200 buffer at 300 K, and 32.8±0.1 Å for GI in PEG 200-free buffer at 300 K. The 300 K values compare favorably with a value of 33.35 Å computed using CRYSOL with default parameters from a 300 K GI crystal structure and with an average of 32.7±0.2 Å obtained in previous 300 K SAXS studies of GI.

Because sample radiation sensitivity at 100 K is much smaller than at 300 K, much longer exposures and much smaller sample volumes can be used. CryoSAXS profiles and molecular envelope reconstructions have been obtained for GI, lysozyme, and a duplex DNA fragment using X-ray illuminated volumes of only 15-25 nanoliters and doses between 100 and 300 kGy (kiloGrays). In these experiments the samples were liquid drops held in crystallography loops, and background subtraction errors were corrected using the BIFT method. Maximum tolerable doses in cryoSAXS are at least 10 MGy (megaGrays), so the signal-to-noise achievable with the same sample volumes is larger by a factor of ~5-10.

These results show that neither cryocooling nor the use of 45% PEG 200 buffers appreciably affects biomolecular sizes or shapes. This is consistent with observations of the effects of cooling and cryoprotectants on proteins in cryocrystallography; aside from a 1-2% volume contraction, 300 K and 100 K structures are generally indistinguishable at the resolution probed in SAXS. Radii of gyration for GI at are ~2% larger at 100 K, which could be due to a somewhat more ordered and larger hydration layer than at 300 K, or from differences in interparticle interference.

Fixed Path Length Sample Cells for CryoSAXS

Background subtraction in cryoSAXS can in principle be made easier and more accurate by using sample cells that place a fixed and accurately reproducible length of sample along the X-ray beam path. In room temperature SAXS, all samples and buffers are usually measured in the exact same cell, one cause of the relatively low throughput. For high-throughput cryoSAXS, each sample and each buffer must be measured in its own cell. Consequently, we need a large number of identical cells providing identical path lengths and background scatter. In our first fixed path length sample cell, having a 1 mm path length, a width of 1.4 mm, and 30 µm thick, 600 µm tall X-ray windows. The cells were easily filled from the top and easily mass-produced. These cells were microfabricated from (110) silicon wafers using an anisotropic potassium hydroxide etch. This etch allowed fabrication of high aspect ratio (111)-oriented X-ray windows with walls of near atomic smoothness and having exceptional SAXS properties. Use of this etch determined other aspects of the cell geometry, including the sloped walls and non-rectangular shape, which had unfortunate consequences. These sample cells were attached using a plastic adapter to a kinematic base that allowed highly accurate and reproducible removal and replacement of the cell, and yielded accurately reproducible I(q) plots from an empty cell. Cell cooling rates in a 100 K nitrogen gas cryostream were measured using a thermocouple to be 25 K/s.

Although buffer-subtracted profiles, $R_g$ values, and molecular envelope reconstructions from cryoSAXS data acquired in these cells were adequate, a number of issues were identified. First, the measured background scattering profile from the empty cell depended upon the cell position in the beam, and scattering from buffer and from buffer+protein depended on the level to which the cell was filled. These effects were due to shadowing/attenuation of upstream scatter by the cell and buffer, the extent of which varied due to the irregular geometry of the holder and the fill level. Second, samples often exhibited strongly anisotropic scatter ("jets") at low q due to nonuniform stress and density variations, or developed cracks, corrupting SAXS profiles below q=0.02 Å$^{-1}$. These effects were not observed when using the variable path length sample cells.

Finite Element Simulations of Thermal Stresses

Cracking and anisotropic scatter at cryogenic temperature are a consequence of differential contraction between the sample holder and sample, and due to the asymmetric geometry of the cell. As discussed below, buffer solutions contract by roughly 5% on cooling from room temperature to 100 K, whereas silicon contracts by only ~0.2%. As long as the sample remains liquid, differences in contraction can be accommodated by fluid flow. But once vitrification occurs, stresses due to differential contraction can drive cracking and other plastic defect formation.

To understand sample fracturing and to develop improved cell designs, finite element simulations were performed using ANSYS. Simulations for the fixed path length cell, assuming no sample slip at the cell boundaries (appropriate in the vitrified state), realistic material parameters, and cooling from 160 K (an estimate of the sample's glass transition temperature) to 100 K showed that peak equivalent stresses occur along the long diagonal of the cell and in the corresponding cell corners, which is where cracking was in fact observed to begin. Simulations of fixed path length cells with a cylindrical geometry and the same cell and sample parameters show that principal stresses are largest near the walls at the upper and lower windows, and that fracturing would most likely occur in and be confined to that region and would be unlikely to spread into the X-ray illuminated region in the sample's center.

Electron Density and Thermal Contraction of CryoSAXS Buffers

The strength of buffer-subtracted biomolecule scattering depends on the electron density difference (contrast) between the buffer and biomolecule. Electron density is determined by the mass density and composition. Although mass densities of most aqueous cryoprotectant solutions have been measured at room temperature, there was no data for cryogenic temperature densities of vitrified cryoprotectant solutions at the concentrations below 50% w/w relevant for cryoSAXS and cryocrystallography. The reason for this lack of data is that the cooling rates needed to vitrify buffers increase exponentially with decreasing concentration; large cooling rates require small sample volumes; and measuring the density of small samples at cryogenic temperatures is not easy.

We have developed a method that has allowed measurement of the 77 K vitreous phase densities of individual drops with volumes as small as 70 picoliters (diameters as small as 50 μm) with an accuracy of ~0.1%. The method involves dispensing a drop into a liquid nitrogen-argon mixture, adjusting the density of that mixture until the drop becomes neutrally buoyant, and then determining the density of the $N_2$—Ar mixture using a test mass and Archimedes principle. At concentrations of 35-45% w/w common cryoprotectants contract by ~5-7% on cooling from room temperature to 77 K. This technique can be used to determine the cryogenic temperature electron density and thermal contraction of all possible cryoSAXS buffers.

Radiation Damage Sensitivity in CryoSAXS

At room temperature, the radiation sensitivities of SAXS samples varies widely, with aggregation-prone biomolecules such as lysozyme tolerating maximum doses of only ~400 Gy. In cryo-EM, in X-ray cryocrystallography, and in X-ray diffractive imaging of biological samples at cryogenic temperatures, all samples show similar radiation sensitivity measured on a loss of resolution (damage) per dose basis, and the same should be true in cryoSAXS. This consistency simplifies design of data collection protocols, since the maximum tolerable exposure can be reliably estimated for any sample.

For these other diffraction techniques, the maximum tolerable dose at ~100 K to achieve a data set of a given resolution (in A) is roughly 10 MGy/Å (where MGy=megagray). For 2 Å crystallography data, this corresponds to a maximum tolerable dose of 20 MGy. For a SAXS data set to $q$~0:3 $Å^{-1}$, corresponding to a resolution of ~20 Å, this yields a maximum tolerable dose of 200 MGy. However, analysis of SAXS data is sensitive both to loss of information at large q and to radiation-induced changes at low q. In cryo-EM, hydrogen bubbles, created by radiolytic cleavage of H atoms and their subsequent recombination to form $H_2$ become evident beyond doses of ~45 MGy. SAXS measurements on cryo-cooled insulin crystals observed a strong increase in scatter attributed to hydrogen bubble formation beyond ~70 MGy. We have examined radiation damage in SAXS at 300 K and various metrics for quantifying it. Experiments on glucose isomerase at 100 K suggest a dose limit of at least 10 MGy—a factor of $10^3$ larger than measured in the same buffer at room temperature.

Therefore, there is need for a sample cell with features for accommodating differential contraction.

SUMMARY OF THE INVENTION

The present invention is directed to, inter alia, a system and method for sample holding in cryogenic temperature and variable temperature small-angle X-ray scattering, in which samples and holders are cooled to cryogenic or intermediate temperatures, respectively. In one embodiment, the present invention is a cryogenic, small angle X-ray scattering (SAXS) application sample holder. The sample holder has a sample cell with a top portion, a base portion, and a chamber extending therebetween and disposed on the base portion. The sample cell has a liquid volume capacity defined by the chamber and the base portion of 0.001 to 10 microliters. Each of the base portion, the top portion, and the chamber are structured and configured to directly contact a liquid sample when in use. One or more radial channels extend through the top portion to the chamber.

In another embodiment, the sample holder has a sample cell including a top portion and a base portion with a chamber extending therebetween, the chamber disposed on the base portion. The sample holder also includes a first window extending across the base portion and a second window extending across the top portion such that a portion of the second window is in alignment with the first window. The sample holder also includes a ring removably attached over at least a portion of the chamber, the ring having one or radial channels extending through the ring to the chamber. The radial channels are in fluid communication with an inner volume of the chamber.

In yet another embodiment, the present invention is a cryogenic, small angle X-ray scattering (SAXS) application sample holder array. The sample holder array includes: (i) a platform having a first sample cell connected to a second sample cell; (ii) the first sample cell includes: a top portion, a base portion, and a chamber extending therebetween and disposed on the base portion, wherein the sample cell has a liquid volume capacity defined by the chamber and the base portion of 0.001 to 10 microliters, wherein each of the base portion, the top portion, and the chamber are structured and configured to directly contact a liquid sample when in use, and one or more radial channels extending through the top portion to the chamber; (iii) the second sample cell includes: a top portion, a base portion, and a chamber extending therebetween and disposed on the base portion, wherein the sample cell has a liquid volume capacity defined by the chamber and the base portion of 0.001 to 10 microliters, wherein each of the base portion, the top portion, and the chamber are structured and configured to directly contact a liquid sample when in use, and one or more radial channels extending through the top portion to the chamber; (iv) a first spacer layer defining a minimum distance between the top portion and the base portion of the first sample cell; and (v) a second spacer layer defining a minimum distance between the top portion and the base portion of the second sample cell.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following description taken in conjunction with the accompanying drawings in which:

FIG. 4A is a side view schematic representation a fixed path length sample cell for cryogenic temperature SAXS;

FIG. 4B is a top perspective view schematic representation a fixed path length sample cell for cryogenic temperature SAXS;

DETAILED DESCRIPTION OF THE INVENTION

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Figure 1:
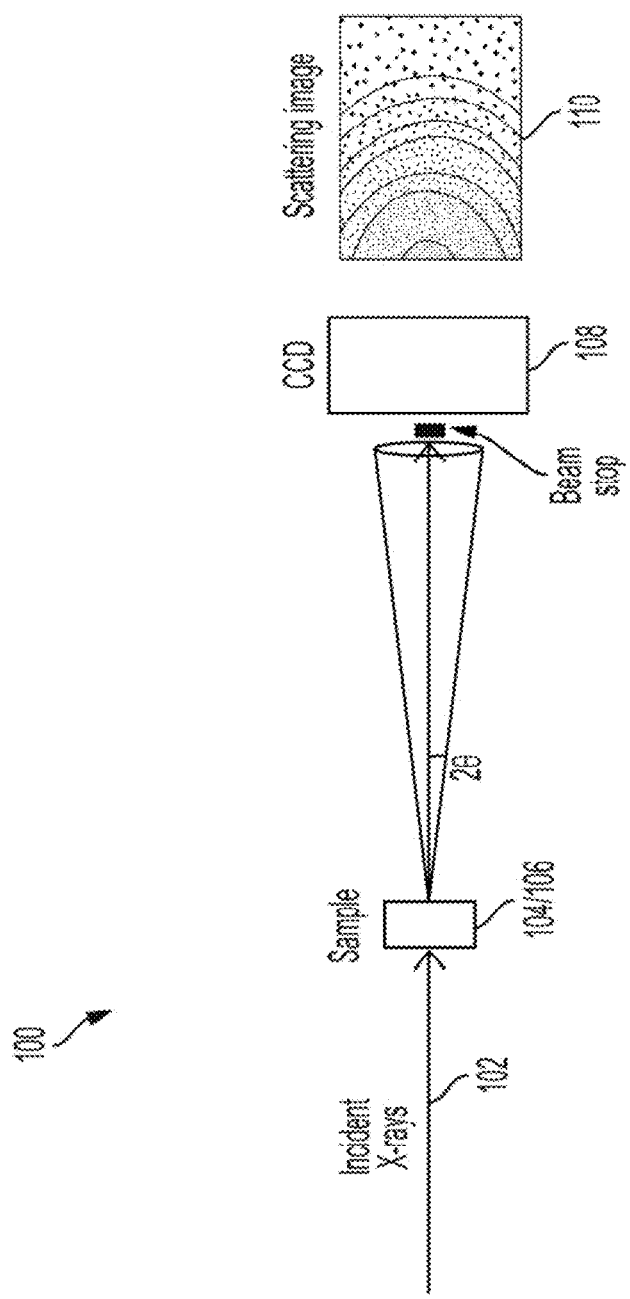
FIG. 1 is a side view schematic representation of a conventional SAXS experiment setup.

Referring briefly first to FIG. 1, there is shown a side view schematic representation of a conventional SAXS experiment setup 100. The general experimental setup in FIG. 1 is utilized in probing a biomolecular structure using small-angle X-ray scattering (SAXS). In the depicted embodiment, an X-ray beam 102 is scattered by a sample 104 in a sample cell 106. As shown in FIG. 1, a 2d detector 108 is placed distal or downstream (e.g., approximately 1 m) of the sample cell 106. As a result, a scattering image 110 is captured and created by the detector 108 when the X-ray beam 102 scattered by the sample 104 (in the sample cell 106). X-ray beams 102 scattered at a given angle by the more widely separated points in larger objects have a larger path (and phase) difference so their scattering decays more rapidly with $2\theta$ and q.

Figure 2:
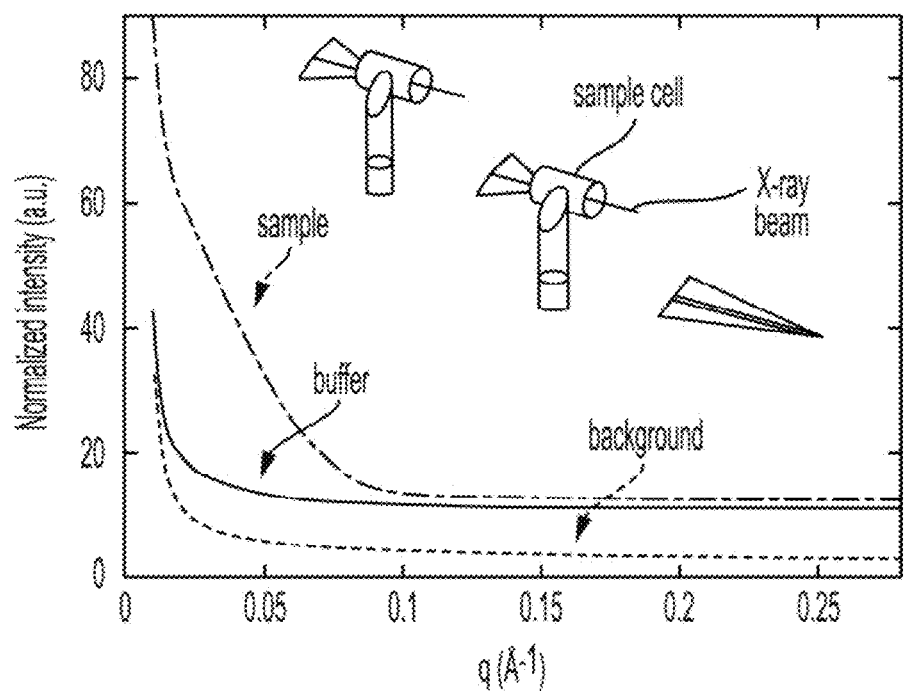
FIG. 2A is a normalized graph of a cryoSAXS profile obtained from vitrified solutions of 2 mg/ml glucose isomerase, its buffer, and the background with the sample removed.
FIG. 2B is a graph of a cryoSAXS profile obtained from vitrified solutions of 2 mg/ml glucose isomerase, its buffer, and the background with the sample removed.
Figure 2:
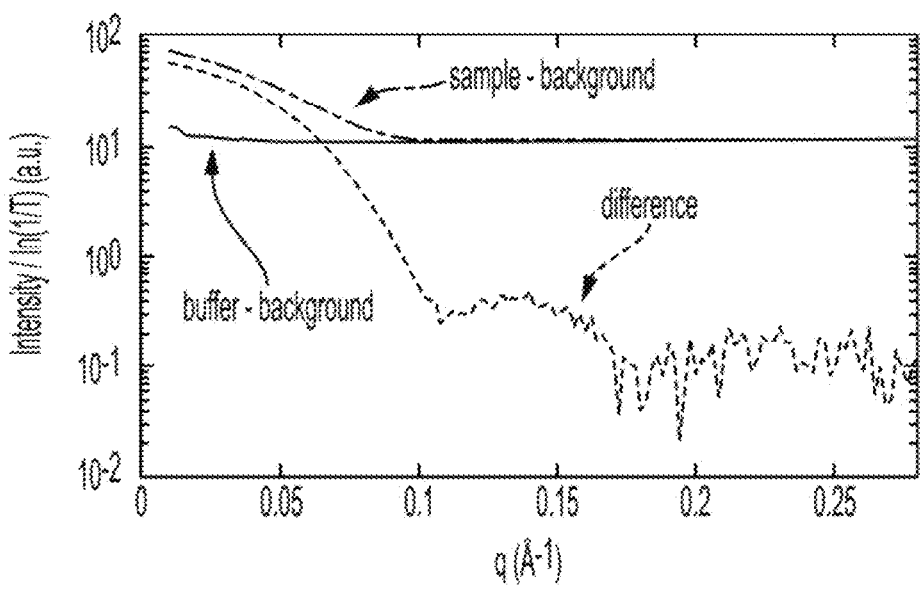

Turning now to FIGS. 2A-2B, there are shown graphs of cryoSAXS profiles obtained from vitrified solutions of 2 mg/ml glucose isomerase (GI) (i.e., the sample), its buffer, and the background (with the sample removed). Prior to utilizing the SAXS setup shown in FIG. 1, two solutions are prepared: (i) a buffer solution containing salts, cryoprotectants and/or other additives in which the biomolecule will remain folded and monodisperse (with no aggregation) and (ii) a sample of interest comprised of an otherwise identical solution containing the biomolecule. Each solution (104) is loaded into a sample cell 106 (FIG. 1). An X-ray beam 102 is directed through the sample cell 106 (FIG. 1) and the scattered X-ray intensity is measured using the photodetector 108.

The intensity recorded by the photodetector 108 is azimuthally integrated about the direct X-ray beam 102 direction to produce an intensity profile, as shown in FIGS. 2A-2B, versus scattering wave vector magnitude q, I(q). When the path length through the two samples 104 (i.e., (i) buffer and (ii) buffer and biomolecule) is identical, then subtracting the I(q) profiles will give the scattering from the biomolecule, which can then be analyzed to determine the biomolecule's shape and other parameters. If the path length is not identical but can be accurately measured, and the background scattering with the sample cell 106 removed is also measured, then accurate background subtraction is still possible. However, slight differences in the X-ray path lengths through the GI and buffer samples may also contribute to differences in scattering.

Figure 3:
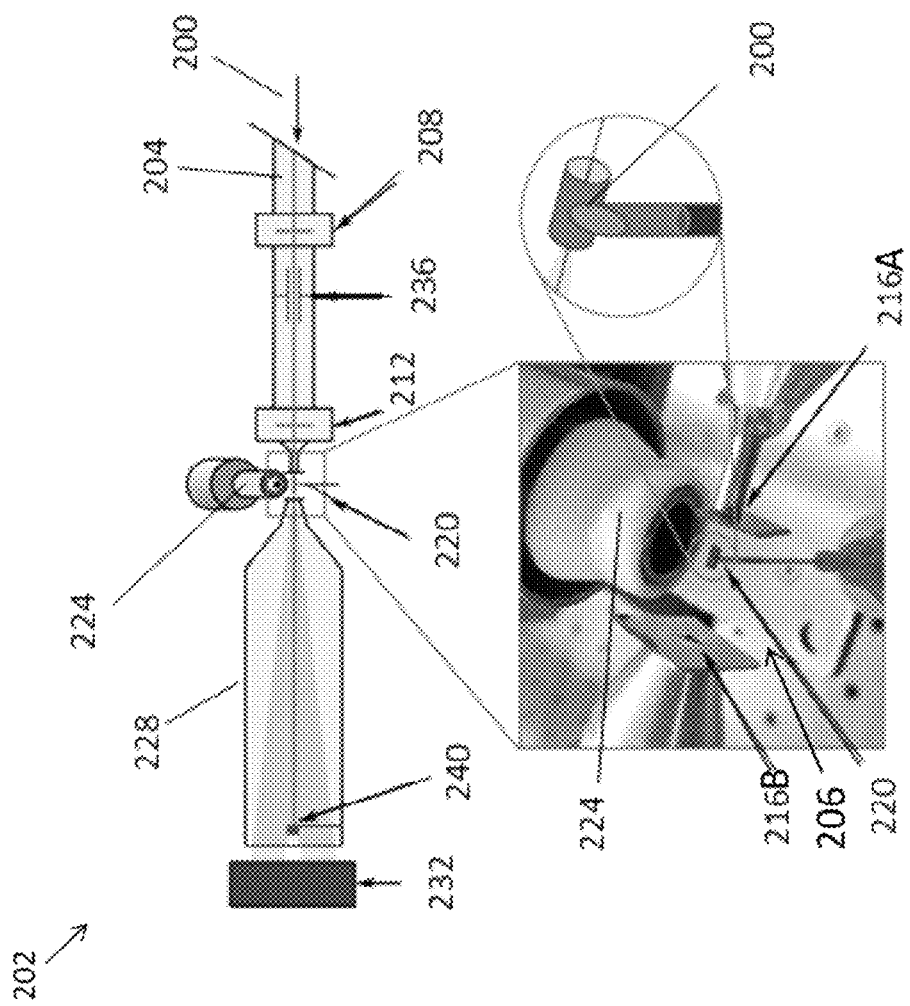
FIG. 3 is a side view schematic representation of an exemplary experimental configuration of a system for performing SAXS measurements on a sample cooled to a temperature below room temperature.

Referring now to FIG. 3, there is shown a side view schematic representation of an exemplary experimental configuration of a system 202 for performing SAXS measurements on a sample cooled to a temperature below room temperature. In the depicted embodiment, the system comprises a proximal, first evacuated flight tube 204 comprising proximal beam defining slits 208 and distal guard slits 212. A distal end of the first evacuated flight tube 204 has a first X-ray transparent window 216A. The first X-ray transparent window 216A may be composed of silicon nitride, polyimide, a biaxially-oriented polyethylene terephthalate (e.g., MYLAR®), polypropylene, or any other suitable material.

Still referring to FIG. 3, a distal, second evacuated flight tube 228 is positioned in alignment with the proximal, first evacuated flight tube 204. A proximal end of the second evacuated flight tube 228 comprises a second X-ray transparent window 216B (also composed of silicon nitride, polyimide, a biaxially-oriented polyethylene terephthalate (e.g., MYLAR®), polypropylene, or any other suitable material). The second X-ray transparent window 216B and first X-ray transparent window 216A are spaced, but parallel, as shown in FIG. 3. The second evacuated flight tube 228 extends distally from the second X-ray transparent window 216B. A distal end of the second evacuated flight tube 228 is positioned proximal (i.e., upstream) relative to an area detector 232.

As also shown in FIG. 3, a gap 206 is between the first and second evacuated flight tubes 204, 228. A gas stream cooler 224 is positioned or otherwise directed toward the gap 206. As shown in FIG. 3, the gas stream cooler 224 extends in a direction perpendicular to the directions of the lengths of the first and second evacuated flight tubes 204, 228. In the depicted embodiment, a sample 220 is held within the gap 206 between the first and second flight tubes 204, 228 and the first and second X-ray transparent windows 216A, 216B.

In use, X-ray beams 200 are passed through the proximal end of the first evacuated flight tube 204, beam defining slits 208 and guard slits 212. The X-ray beams 200 then pass through the first X-ray transparent window 216A before illuminating the sample 220 held within the gap 206 between the first and second evacuated flight tubes 204, 228. The gas stream cooler 224 injects or otherwise expels a temperature-controlled nitrogen gas cryostream into the gap 206. Scattered X-ray beams 200 then pass through the second X-ray transparent 216B into the second evacuated flight tube 228 and are recorded using the area detector 232.

In the depicted embodiment, the system 202 additionally comprises a proximal (i.e., upstream) ion chamber 236 and a distal PIN diode (or other X-ray-photon-sensitive beamstop) 240. The ion chamber 236 and the PIN diode 240 measure the X-ray flux incident upon and directly transmitted through the sample 220, allowing determination of the transmission coefficient and path length of the sample 220. The ratio of these values for the two solutions ((i) buffer and (ii) buffer and biomolecule) can be used to normalize their SAXS profiles and allow accurate background subtraction. In practice, obtaining path length normalization to the better than 0.5% (and, ideally, better than 0.1%) accuracy required for accurate biomolecular structure determination is challenging.

Referring now to FIGS. 4A-4B, there are shown side and top perspective views schematic representations of a fixed path length sample cell 310 of the system 202 (FIG. 3). In the depicted embodiments, the sample cell 310 is microfabricated from a (110) Si wafer 300 by using an anisotropic KOH etch and $SiO_2$ stop/cap layer 304. The sample cell 310 has two parallel, near-atomically-smooth 30 μm thick, 600 μm tall flat walls 308 that serve as holding cell X-ray windows, and is filled with the two solutions ((i) buffer and (ii) buffer and biomolecule) described above. The X-ray beam 312 passes through the holding cell X-ray windows 308. This sample cell 310 has a relatively large thermal mass that limits cooling rates, and the interior cell volume of the sample cell 310 has an irregular geometry due to the selective etching of specific crystallographic planes (e.g., 316). The sample cell 310 can be held in a machined acrylic holder attached to a xyz translation stage (not shown), allowing positioning of the sample in the pathway of the X-ray beam 312, as shown in FIG. 3.

Figure 5C:
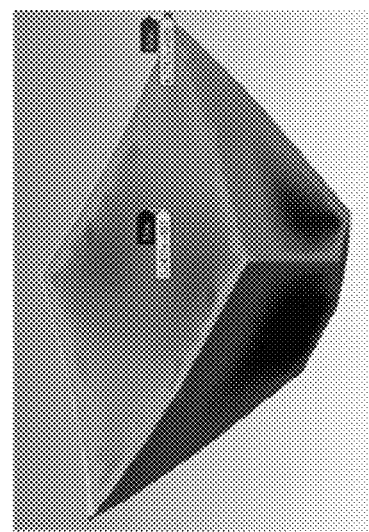
FIG. 5C is an image of a strain profile within a sample contained in the sample cell of FIGS. 4A-4B.
Figure 5B:
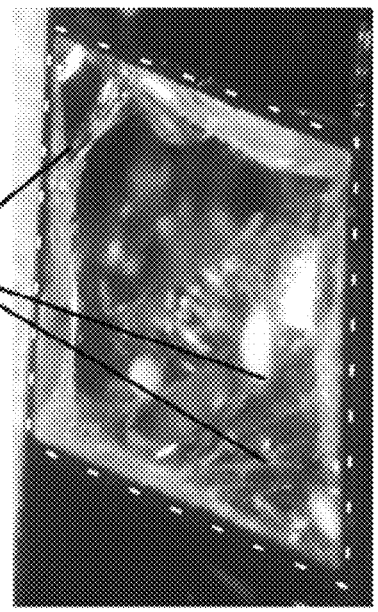
FIG. 5B is an image of a cryogenically cooled sample in the cell of FIGS. 4A-4B.
Figure 5A:
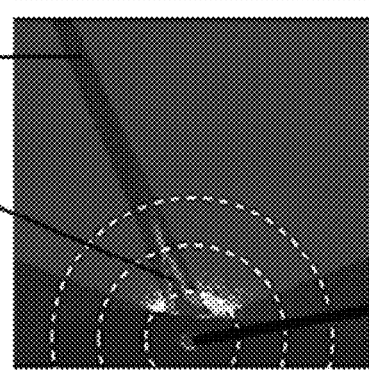
FIG. 5A is an image of SAXS intensity as measured on an area detector from a sample cooled to T=100 K in the sample cell of FIGS. 4A-4B.

Turning now to FIGS. 5A-5C, there are shown images of the small-angle scattering intensity measured on the area detector from the sample at T=100 K, cooled within the sample cell 310 of FIGS. 4A-4B. The scattering is highly anisotropic, with a "jet" 400 projecting from the direct beam center 404 out to high q. The dark shading 408 indicates areas to which a mask was applied in analysis. FIG. 5B shows an image of a sample that was cooled in the cell of FIGS. 4A-4B to T=100 K. The sample has developed fractures 412, and the appearance of these fractures corresponds with the observation of anisotropic SAXS scatter as in FIG. 5A. These fractures result because the silicon sample cell 310 and the sample within it contract by different amounts during cooling, which create stresses. The irregular shape of the sample cell 310 results in highly anisotropic and nonuniform stresses and crack formation in particular directions. FIG. 5C shows the resulting image of a simulation of the equivalent stress distribution (related to the cracking probability) within a vitreous ice sample cooled from its glass transition (where the liquid solidifies and the sample develops a finite shear modulus) to T=100 K, using the finite element simulation program ANSYS. The simulation assumed a no-slip boundary condition at the sample-holder interface, and stress increases from dark to light. The simulation confirms the highly non-uniform and anisotropic nature of the sample stresses.

Figure 6:
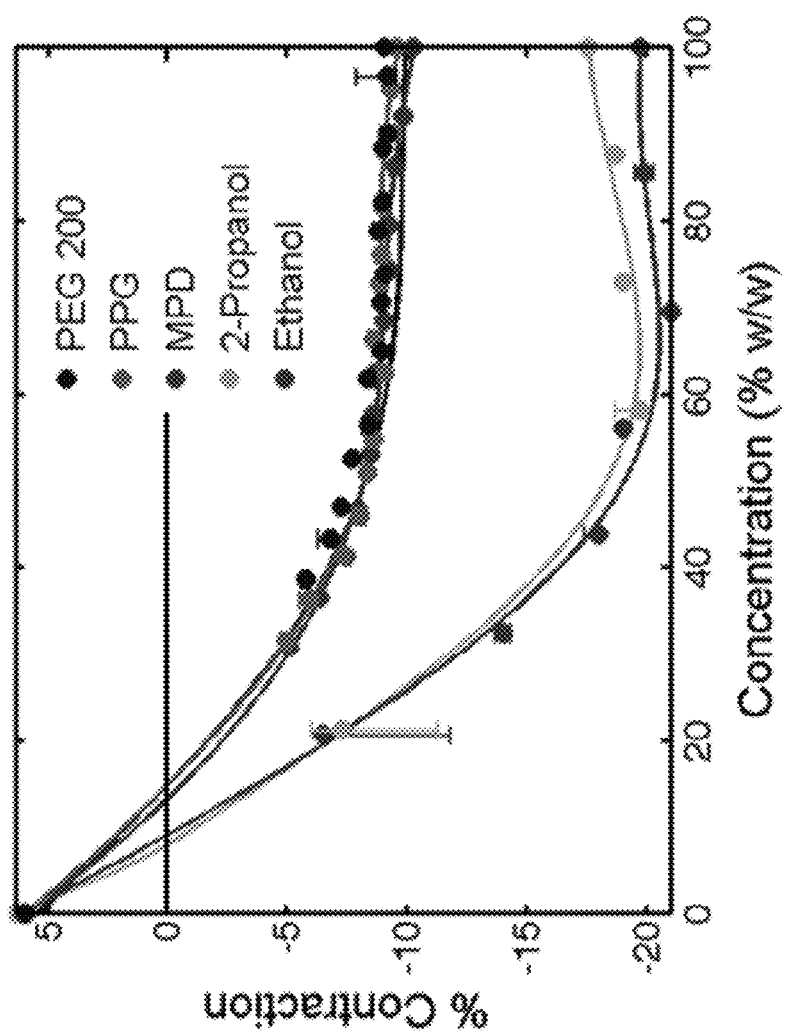
FIG. 6 is a graph of the percent volume contraction on cooling from room temperature to T=77 K of aqueous solutions of common cryoprotective agents versus cryoprotectant concentration.

Referring now to FIG. 6, there is shown a graph of the measured volume contractions of aqueous solutions containing common cryoprotectants on cooling from 300 K to 77 K. The volume contractions for concentrations required for effective suppression of ice formation (>20% v/v) are between 1% and 20%, with values near the 40% w/w concentrations used in previous cryoSAXS experiments of 7-16%. These are all much larger than the volume contraction of silicon (~0.07%) and solid polymers over the same temperature range. For protein-friendly cryoprotectants like glycerol and propylene glycol, the buffer electron density increases with increasing cryoprotectant concentration, reducing the SAXS contrast and the scattering by the biomolecule. Both thermal contraction mismatch between sample and cell and the strength of biomolecule scattering can thus be optimized by designing cells to maximize cooling rates and thus minimize required cryoprotectant concentrations. Large cooling rates will also facilitate kinetic trapping of structural features and preservation of the room/biological temperature structure.

In FIGS. 7-12, for SAXS at cryogenic and variable temperatures, an improved sample cell 610 has the following features. First, the sample cells 610 can be easily filled using pipette tips and automated liquid handlers, including ultrasonic liquid dispensers. The use of liquid handlers that dispense through pipette tips or syringe needles sets a limit on the minimum inside diameter of the sample cell of ~150 micrometers; the diameter of a 35 gauge needle is 125 micrometers.

Second, the sample cells 610 allow the sample to be cooled as rapidly and uniformly as is feasible, so as to ensure that a glass phase free of ice crystallites is obtained. Since cryoprotectants generally increase the cryogenic temperature glass phase density and reduce the SAXS signal from the biomolecule, this suggests using as low a concentration of cryoprotectants as possible. Rapid sample cooling requires a small total thermal mass, a large surface-to-volume ratio, and thin and/or high thermal conductance sample cell walls. Minimizing thermal gradients within the sample requires that heat transfer be limited by the cell walls or gas boundary layer and not by the sample itself. The optimal sample length along the X-ray beam is determined by the scattering and absorption of the X-rays by the sample; a general rule of thumb used in SAXS is that the sample should give a path length comparable to the X-ray attenuation length in the sample; for longer path length an increasing amount of the small-angle scattering generated by the sample will be absorbed by the sample itself. This depends on sample composition and X-ray energy, but for typical biomolecular samples and X-ray energies used in SAXS, sample path lengths of 0.25 to 2 mm and typically around 1 mm. The sample's diameter or width perpendicular to the X-ray beam is limited by the beam diameter—usually defined as where the intensity drops to some percentage of its peak value in the beam center—and by the decay length of the "tails" of the beam, since scattering from the containing walls of the sample cell increases background and is to be avoided. Typical X-ray beam sizes used in biomolecular SAXS range from 100 micrometers to a few millimeters, and X-ray beams as small as 1 micrometer are now in regular use for biomolecular crystallography. The tails of the beams can extend to a few times the nominal beam diameter, depending on the beam collimation used, and a rough rule of thumb is that the sample diameter should be at least 3-5 times the beam diameter. Another constraint on sample diameter is set by the volume of sample required to obtain a SAXS pattern with a desired signal to noise ratio, when the sample is irradiated with the maximum X-ray dose that does not cause appreciable degradation of the sample and its SAXS signal. At room temperature the dose limit is small and the required sample volumes are of order 1 microliter or more, but at cryogenic temperatures dose limits can be 100 to 1000 times larger, with correspondingly smaller sample volumes. The practical range of cell volumes is thus between ~1 nanoliter and 1 microliter, corresponding to cell diameters of roughly 40 micrometers and 1 millimeter.

In an embodiment, the measurements include a 100 μm X-ray beam diameter, a 500 μm cell diameter, and a 1 mm path length, giving a cell volume of ~200 nanoliters. With this sample volume, maximum cooling rates in a nitrogen cryostream will be ~100 K/s. For a 50 μm beam and 150 μm cell diameter (the smallest diameter that could be filled using 35 gauge hypodermic tubing), the cell volume would be 18 nanoliters and cooling rates would increase to ~1000 K/s.

Third, the sample cells 610 provide minimal background scattering from sample cell components. This requires that the windows through which the X-rays pass be very thin and/or be made of low atomic number elements; that the tails of the beam not strike the sidewalls, and that X-rays scattered from upstream beamline components not be scattered from cells, which suggests that the cells be made of low-Z materials and have minimal mass.

Fourth, the sample cells 610 minimize stresses within and cracking of samples when they are cooled into the glass phase, so as to maintain as homogeneous a sample as possible. Differential thermal contraction between sample and cell can be reduced by more closely matching the thermal contraction of the cell materials to that of the buffer. CryoSAXS buffers at typical concentrations used in previous experiments contract by at 5-7% between 300 K and 100 K. Silicon contracts by only ~0.07%, but polymers including SU-8, PDMS, polyethylene, and PET contract by 1-2%. Differential contraction can be managed by using thin cell walls that can flex inward to accommodate excess sample contraction. Most buffer contraction occurs between 300 K and the buffer's glass transition temperature (~160 K), while the buffer is still liquid, so its excess contraction might also be managed by allowing sample flow from outside to inside the cell's main chamber.

Fifth, the sample cell 610 must provide accurate and reproducible X-ray path lengths through the sample to allow accurate subtraction of I(q) data collected from adjacent cells containing a sample and its buffer.

Figure 7:
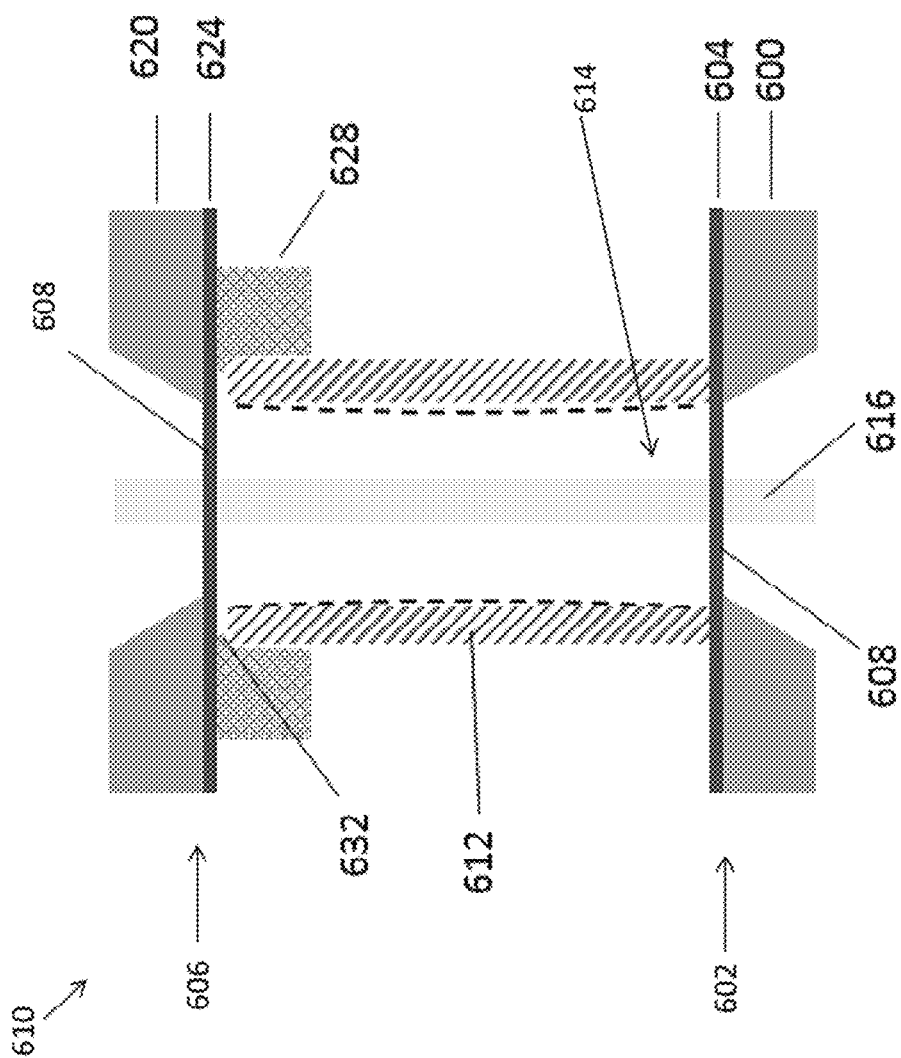
FIG. 7 is a top view schematic representation of a sample cell, according to an embodiment.

Turning now to FIG. 7, there is shown a top view schematic representation of a sample cell 610, according to an embodiment. The sample cell 610 is comprised of a bottom portion 602 that holds the sample 614, and a top portion 606 that is placed onto the bottom portion 602 after the sample cell 610 has been filled. In this example, the bottom portion 602 of the sample cell 610 is formed from a silicon wafer 600 coated with a thin SiN layer 604. The silicon wafer 600 is selectively etched through to form a circular window 608 comprised of the SiN layer 604. A 200 micrometer wafer thickness provides a good compromise between mechanical stiffness and durability and the fabrication time required for through-etching. Windows for X-ray scattering experiments are known an understood by those of ordinary skill in the art. Such windows 608 can have thicknesses from 100 nm to 25 micrometers and can be made of SiN, beryllium, and various non-crystalline polymers including polyimide (Kapton). Graphene can also be used. In one embodiment, the windows 608 are less than 20 microns thick. A roughly 1 micrometer thickness of SiN (99% X-ray transmission) gives a good compromise between background X-ray scatter from the window and mechanical stiffness.

The sample 614 is held in a sample cell 610 comprising a chamber, such as a cylindrical or near cylindrical tube 612 extending between the top portion 606 and the bottom portion 602. Cylindrical shapes minimize points of stress concentration and the probability of cracking; however an oval-shaped chamber can be used to achieve the same effect. The chamber (e.g., cylindrical tube 612) is composed of compliant material, such as polymer (e.g., polyethylene terephthalate, polyimide, SU-8, or PDMS) that easily deflects when force is applied thereto, minimizing stress on the sample 614 due to the differential contraction between the sample 614 and the sample cell 610. The polymer may also be clear to allow for optical inspection of the sample 614 within the sample cell 610. In the depicted embodiment, the cylindrical tube 612 (i.e., chamber) has an inner volume such that the wall comprising the cylindrical tube 612 is between 10 to 200 microns thick. The wall (i.e., cylindrical tube 612) has mechanical rigidity, but is thin enough to provide good heat transfer. The chamber (e.g., cylindrical tube 612) may also have a length between 0.1 and 2 mm (preferably 0.5 mm to 2 mm). The X-ray beam 616 passes through the windows 608 and along the axis of the cylindrical tube 612. In one embodiment, the diameter of the cylindrical tube 612 is approximately 5 times the diameter of the X-ray beam passing through the windows 608. For example, the diameter of the cylindrical tube 612 is between 100 microns and 2 mm.

As shown in FIG. 7, the walls of the cylindrical tube 612 are fabricated from a polymer layer that is coated onto or bonded to the bottom wafer 600. As recited above, the polymer can be polyimide, PDMS, SU-8 or any other polymer that can be fabricated in a high aspect ratio with minimal sidewall slope. SU-X, available in sheet form, may be particularly suitable, as sidewall slopes of 20:1 or more are feasible using ordinary lithography. For a 1 mm path length, equal to the cylinder height, a sidewall slope of 20:1 corresponds to a 50 micrometer difference in sidewall width between top and bottom. Multiphoton photolithography can give much steeper walls. In the example shown in FIG. 7, the inner diameter of the cylinder is 500 micrometers and the walls have an average thickness of 100 micrometers. The thin, elastically compliant walls of the tube can deflect inward (typically in a way that flattens their cylindrical shape into an oval that reduces their enclosed volume), as indicated by the dashed lines in FIG. 7, in response to stresses caused by thermal contraction of the sample.

The top portion 606 of the sample cell 610 is a separately fabricated sealing "cap." The X-ray transparent window 608 and support can be fabricated from a silicon wafer 620 coated with silicon nitride 624 and then etched, as for the bottom window 608 and support. (Note, in use, at least a portion of the top and bottom X-ray transparent windows are in alignment to facilitate passing of the X-ray beam through the sample cell 610). The top portion 606 (i.e., cap) can move up and down along the axis of the chamber (e.g., cylindrical tube 612) to accommodate thermal expansion/contraction of the sample 614. The cap 606 also has a sealing ring-shaped structure 628 that slides over the end of the cylindrical tube 612 and creates a seal that holds the sample 614 in place against the windows 608. This sealing ring-shaped structure 628 can be fabricated from polymers commonly used in microfabrication including SU-8, PDMS, and polyimide. The sealing surface may have a length parallel to the cylinder axis that is large compared with the expected length contraction of the sample on cooling, and that is large enough to provide a secure placement. As shown in FIG. 7, the sealing ring 628 has a height of 200 micrometers. The inner diameter of the ring 628 is slightly larger than the outer diameter of the cylindrical tube 612. The other diameter of the ring 628 can be anywhere from 20 to 500 micrometers, as long as it is much smaller than the spacing between cells 610 in an array. Preferably, the sealing ring 628 has a small "lip" 632 that serves to separate the cylindrical tube 612 from the flat window 608.

Figure 8:
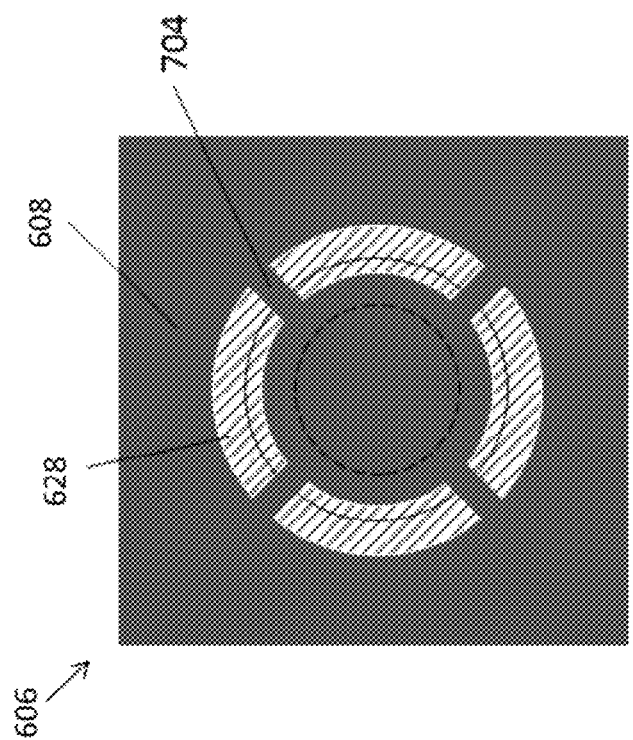
FIG. 8 is a bottom (or top) view schematic representation of a cell cap, according to an embodiment.

Referring now to FIG. 8, there is shown a bottom (or top) view schematic representation of the cell cap 606, according to an embodiment. The sealing ring 628 has radial channels 704 that extend part way or all the way through the lip 632 (FIG. 7) of the sealing ring 628 to the window layer 608. These radial channels 704 allow air and excess liquid to be pushed out of the cell 610 when the top sealing cap 606 is installed. During cooling, as long as the sample 614 remains liquid this initially expelled liquid can flow back into the cell 610 to make up for decreasing the volume of the sample 614 caused by thermal contraction. Without these channels, thermal contraction of the sample 614 during cooling will create a pressure difference that deforms the walls 612 and windows 608 of the cell 610, and that could lead to cavitation, which would likely completely corrupt the SAXS signal. The radial channels 704 are very small—perhaps 100 micrometers or smaller in width, so evaporation through them should produce little change in solute concentrations in the sample contained within the cell during the time between cell filling and cryocooling (for cryogenic temperature measurements), or between filling and SAXS measurements at temperatures where the sample remains liquid provided that the cells are filled at the X-ray source rather than remotely filled and then shipped. Elimination of all air bubbles along the X-ray beam path is critical to obtaining accurate SAXS data.

Figure 9:
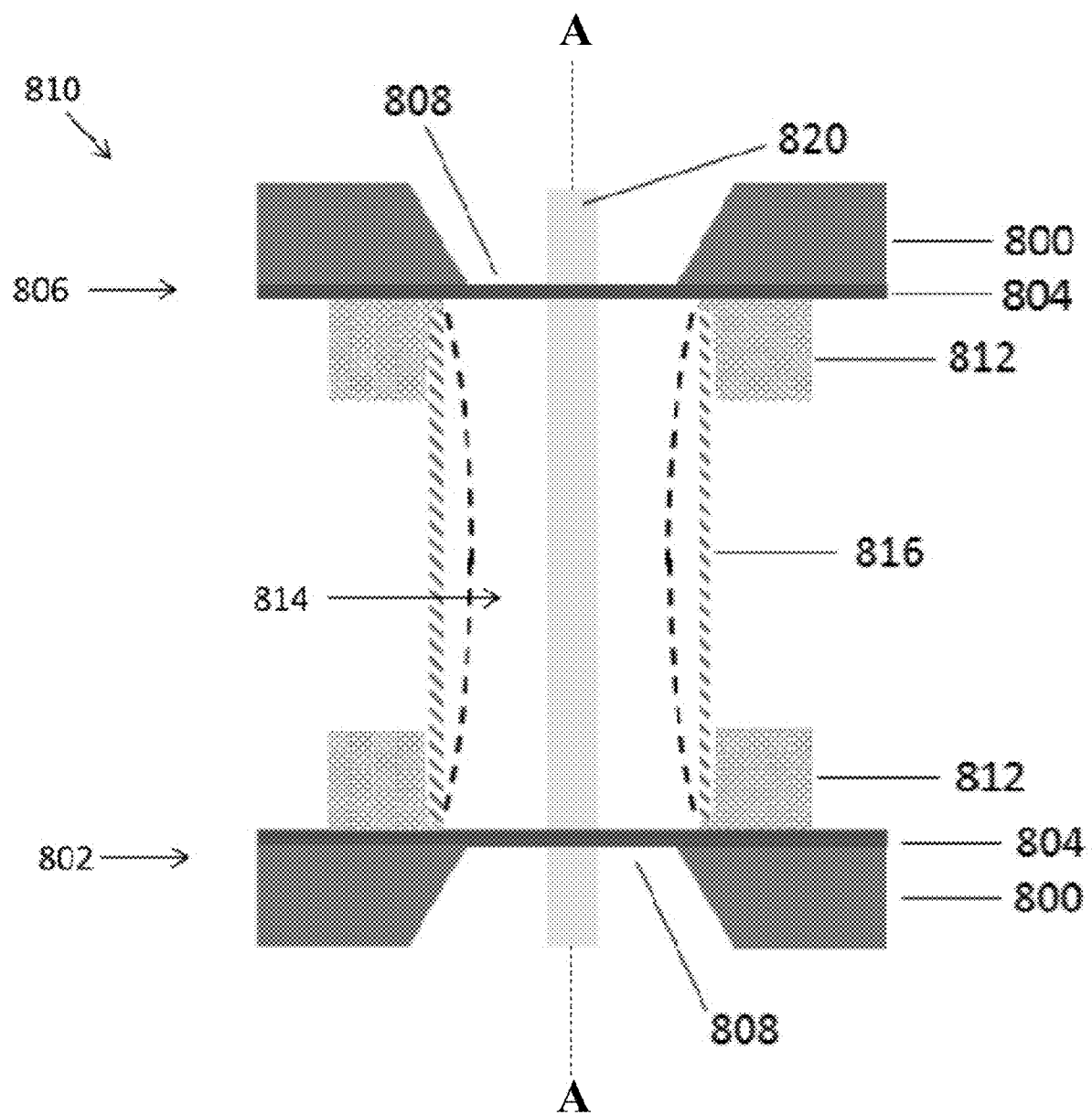
FIG. 9 is a cross-sectional side view schematic representation of a sample cell, according to an alternative embodiment.

Turning now to FIG. 9, there is shown a cross-sectional side view schematic representation of a sample cell 810, according to an alternative embodiment. In the depicted embodiment, the bottom portion 802 (bottom sealing "cap") of the cylinder 816 has the same design as the top portion 806 (top sealing "cap"), comprised of a silicon wafer 800 coated with SiN 804, etched on the uncoated side to form a SiN window 808. Both the top portion 606 (i.e., top sealing cap) and bottom portion 802 (bottom sealing cap) can move up and down along the axis (AA) of the chamber (e.g., cylinder 816) to accommodate thermal expansion/contraction of the sample 814. A sealing ring 812 of PDMS, SU-8, or other polymer has a lip 632 (FIG. 7) and radial channels 704 (FIG. 8) that allow air and liquid flow into and out of the cylinder tube 816. The sample holding cylindrical tube 816 in this case is a separately manufactured precision cut thin-wall tube of a polymer, glass or a metal. The tubing must be precision cut—e.g., using a razor blade or a laser—to exact and reproducible lengths to facilitate fixing a common X-ray path length for all cells 810. For example, the tubing could be polyethylene terephthalate (PET) or polyimide medical tubing with a wall thickness of 25 micrometers. The very thin walls of uniform thickness produced by extrusion or drawing ensure fast, uniform cooling. Because there is no side wall angle as with cylinders formed from thin films by lithography, the thickness of long cylinders can be much smaller. The advantage to using optically clear tubing is that it will allow the cold sample to be visually inspected for evidence of ice. The use of thin, highly deformable polymer tubing will allow maximum stresses generated in the sample 814 due to differential thermal contraction of the sample 814 and sample cell 810 to be minimized during cooling. Polymer tubing will contract significantly on cooling, but the appropriate choice of material and geometry for the sealing ring 812 may ensure that an adequate seal is retained. Otherwise, the tubing can be glued to the bottom sealing ring using an epoxy or other adhesive.

The presence of radial channels 704 (FIG. 8) in both the top and bottom sealing rings 812 allows air to be pushed out the bottom portion 802 during filling, so that air bubbles are less likely to be trapped, and also for excess sample liquid to flow out during sealing and back in during cooling.

In an alternative embodiment, the SiN layer 804 can be replaced with a thin layer of any material that produces very low X-ray absorption and unstructured small angle scatter. For example, a 12.5 micrometer polyimide layer (>99% transmission) should provide adequate performance and mechanical rigidity. This layer could be deposited by spinning and then baking a liquid, or else could be in the form of a sheet that is bonded to the silicon wafer using an adhesive.

In an alternative embodiment, the silicon wafers 800 could be replaced with any thin, rigid, and flat material available in sheet form including sapphire, metals, and plastics.

In all embodiments, high X-ray transmission windows will minimize cell background scatter and contributions from window variability to errors in background.

Fixing all dimensions along the X-ray path 820 in FIG. 9 (particularly the tube or cylinder length) for all sample cells 810 in an array to better 1% needed for reproducible path lengths and buffer scattering subtraction over an entire cell array is challenging.

Figure 10:
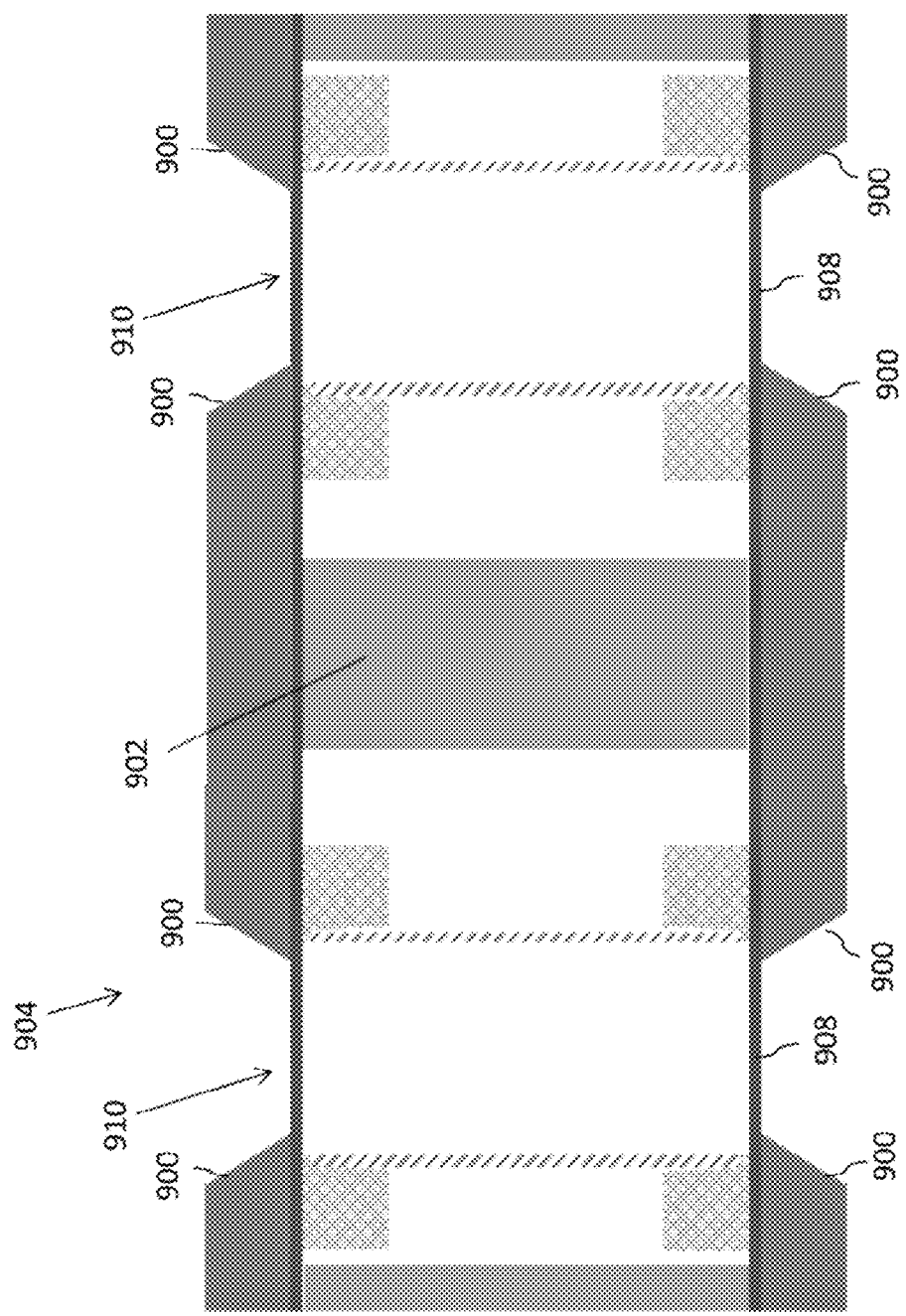
FIG. 10 is a cross-sectional side view schematic representation of sample cells in a sample cell array, according to an embodiment.

Turning now to FIG. 10, there is shown a cross-sectional side view schematic representation of sample cells 910 in a sample cell array 904, according to an embodiment. FIG. 10 shows how a low thermal expansion spacer 902 can be used to fix the separation between the X-rays windows 908 (and top and bottom portions) in each cell 910. In other words, the spacer 902 defines a minimum distance between the X-rays windows 908 (and top and bottom portions) in each cell 910. The top and bottom silicon wafers 900 in a cell array 904 can be separated by a low thermal expansion spacer layer 902 (e.g. of silicon or quartz glass). The spacer layer 902 could be continuous, with through holes for each cylindrical cell 910, or it could, e.g., circle the outer periphery and pass down the middle of a sample cell array 904. The spacer 902 may also have many large lateral gaps forming through-passages so as not to interrupt the flow of cold gas or liquid nitrogen over the sample during cooling. Thermal contraction of the sample and of the polymer tubing between the silicon wafers 900 during cooling will pull the two wafers 900 together into firm contact with the spacers 902 and fix the separation between the wafers 900. Deformation of the windows 908 due to sample contraction may occur, but these deformations should be the same for a biomolecule sample and its buffer, and the windows 908 should remain essentially flat over the small beam footprint, so effects on path length should be small. The top and bottom wafers 900 could be held together and, in one embodiment, to a sample cell carrier using a clamp.

Figure 11:
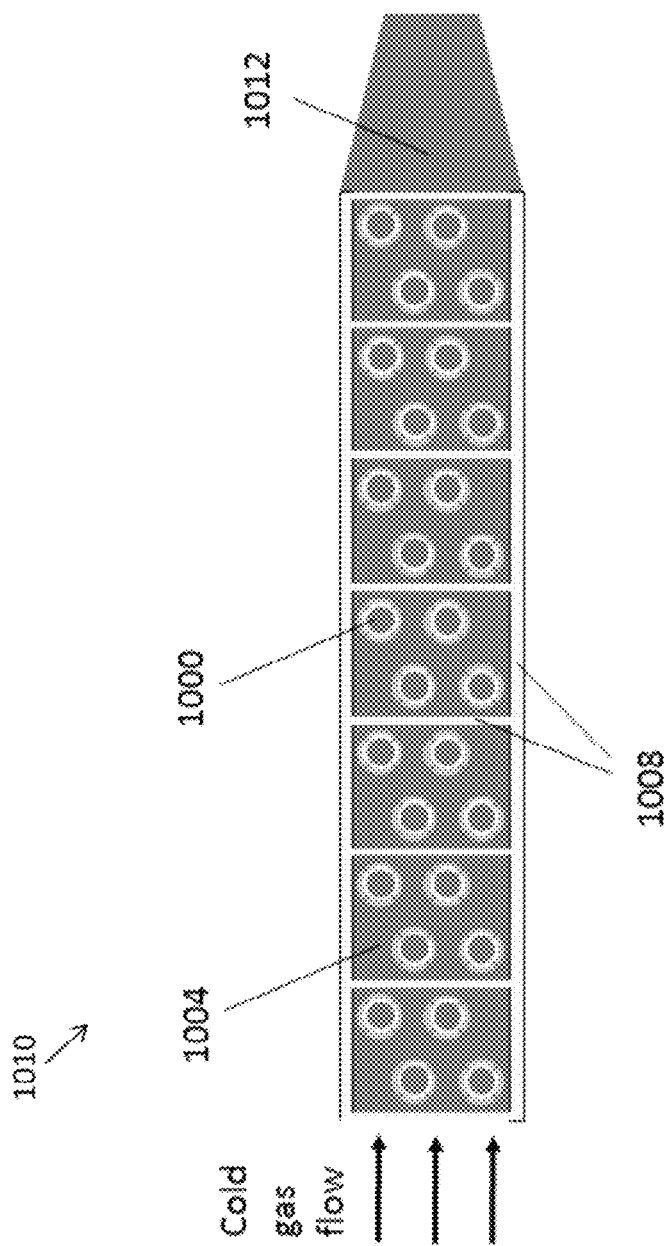
FIG. 11 is a cross-sectional side view schematic representation of a sample cell array for cryogenic and variable temperature SAXS, according to an embodiment.

Referring now to FIG. 11, there is shown a cross-sectional side view schematic representation of a sample cell array 1010 for high-throughput cryoSAXS or variable temperature SAXS, according to an embodiment. The array 1010 has dimensions of 3 millimeters by 15 millimeters, and is narrow enough to entirely fit within the cold gas stream generated by standard cryocoolers used in biomolecular crystallography. It is comprised of 28 sample cells 1000 on a single substrate (e.g., a silicon wafer) 1004, each with a length along the X-ray beam path (perpendicular to the plane shown in FIG. 11) of 1 millimeter and a volume of 200 nanoliters. The top sealing caps are fabricated on a separate substrate of similar dimensions, and are not shown, and are kept a fixed separation from the bottom substrate by the low thermal expansion spacer layer 1008. The tapered end 1012 of the sample cell array 1010 can be inserted into goniometer base as used in biomolecular crystallography. The array 1010 would be loaded from the top using a standard liquid handler equipped with 32 gauge syringe needles. The top sealing wafer of the array is then applied and, if needed, edge clips used to hold it in place. The array edges or additional fiducial marks can aid to align the array in the X-ray beam.

These sample cell arrays can be either reusable or disposable. Assuming a yield of 300 per 8 inch wafer, production costs per assembled final cell should be less than $3 and retail prices should be $10-$15 for arrays with ~25-100 cells. This should be very competitive, especially for industrial users that must pay for synchrotron beam time.

The high density sample arrays 1010 in FIG. 11 can be incorporated into modified versions of hardware used for sample cooling, storage, transport, and beamline handling used in cryocrystallography. The sample cell array 1010 is thus preferably inserted into a standard magnetic steel goniometer base, with keying to ensure precise alignment and marking to automate array orientation. This would allow them to be used with the cryotongs, cryovials, high-throughput sample cassettes, storage dewars, dry shippers, and sample automounters of cryocrystallography.

Figure 12:
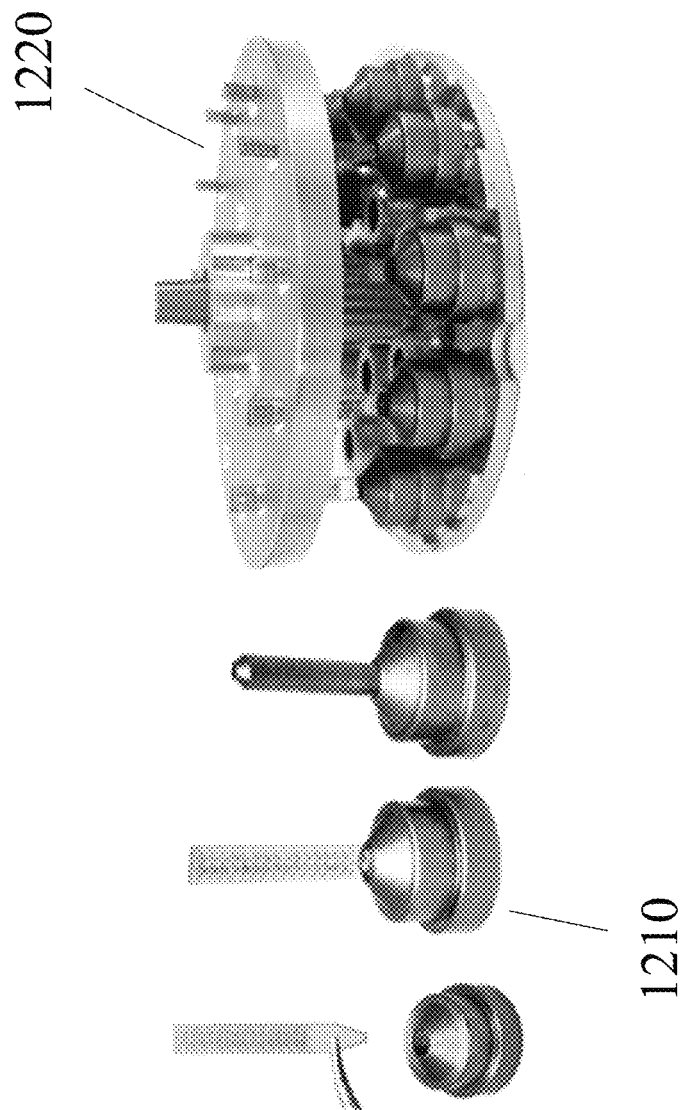
FIG. 12 is a perspective view of components for storing and shipping sample cell arrays for cryogenic and variable temperature SAXS, according to an embodiment.

Turning now to FIG. 12, there is shown a perspective view of components for storing and shipping sample cell arrays for cryogenic and variable temperature SAXS. In particular, there is shown a high density sample grids in serial crystallography. In the depicted embodiment, an SBS format frame can be designed to hold the cell array+ goniometer base (1210) for filling by an automated liquid handler 1220 and attachment of the top sealing window array. A similar approach has been used in products (e.g., the X-Chip and the Crystal Slide from Greiner Bio One) that allow protein crystallization and in situ X-ray inspection, but the positional tolerances required here to fill arrays of 500 (or 200) μm diameter tubes are substantially tighter. The only real sacrifice in using cryocrystallography hardware is in the maximum size of the cell arrays, which will be constrained in width by the cryostream size (which could be expanded) and in length by the sample cassettes and auto-mounter heads (which could be modified). However, as long as sample exchange times are below 10 s, this size limit will have a relatively small impact on throughput.

One possibly serious issue is the exceptional sensitivity of SAXS signals to ice from any source that may condense on or adhere to the exterior of sample cell windows. Careful environmental humidity control may be needed to prevent ice accumulation in liquid nitrogen during sample cooling and storage, to prevent frosting due to turbulence in the cryostream, and to remove ice from cell windows without disturbing the sample.

At present, the fastest claimed throughput at a room-temperature bioSAXS beamline (SYBYLS at the Advanced Light Source) is 96 samples (including buffers) in 2 hours. For cryoSAXS using a high brilliance source, exposure times to achieve adequate signal to noice will be less (usually much less) than 1 seconds. Allowing 0.5 seconds between measurements for sample array translation and detector readout, and 10 seconds for exchanging sample arrays, the minimum cryoSAXS throughput would then be ~2000 samples/hour, and could feasibly reach well beyond 4000 samples/hour. Total sample consumption (at 200 nanoliters/sample) for 4000 samples would be less than 1 milliliter, or about 1-2 milligrams of biomolecule, which would be reduced to ~0.2 milligrams for 200 micrometer diameter, 30 nanoliter cells.

Temperature Dependent SAXS

Solution SAXS has been used to probe biomolecular structure, unfolding, and interactions at temperatures between ~0° C. and ~60° C. However, solid state NMR experiments, neutron scattering experiments, and variable temperature crystallography experiments show that the activation of most conformational motions occurs between ~180 K and 260 K, a range that has been largely inaccessible to solution SAXS and solution NMR. More generally, temperature is a key thermodynamic "knob" for exploring structure, dynamics, and energy landscapes in complex systems, and the formation of ice has largely prevented its proper exploitation in study of biomolecules.

SAXS data is corrupted by much smaller ice fractions than are required to corrupt crystallographic data. Unlike in nanoconfined crystal solvent, ice nucleation in bulk, cryo-protectant-free buffers occurs very rapidly below ~240 K. However, cryoprotectants at the concentrations used in cryoSAXS substantially lower the buffer's freezing temperature and dramatically reduce ice nucleation rates. If ice nucleation occurs primarily in the bulk buffer (rather than on surfaces), then the ice nucleation probability can be further reduced by reducing buffer volumes. Consequently, if a small volume, cryoprotectant-containing bioSAXS sample can be cooled fast enough to (or through) a desired temperature and SAXS data collected rapidly, it should be possible to obtain ice-free SAXS data probing biomolecular conformations and interparticle interactions over a wide temperature range below 270 K, either by using sufficient cryoprotectant concentrations to lower the solutions freezing temperature to below the desired measurement temperature, or by maintaining the sample in a supercooled liquid state for a time sufficient to collect a SAXS profile.

The nanoliter-volume sample cell arrays of the present invention, designed to maximize cooling rates, will be ideal for SAXS studies of ice formation in cryoprotected buffers and for performing SAXS on biomolecular solutions cooled to low temperatures where the solutions remain liquid. Their small volumes give rapid cooling and low nucleation rates. To characterize ice formation in cryoprotective buffers, SAXS data can be collected continuously at high frame rates during cooling, and the time for ice formation from the start of cooling will be measured versus cryoprotectant concentration and final temperature. Each cell array can be loaded with a series of concentrations, and the cryostream cycled on and off as each cell is moved into the X-ray beam (since buffers should have no memory of previous freeze-thaw cycles). Experiments using biomolecule-containing buffers will then evaluate the accuracy of buffer and background subtraction for patterns collected at equal times from the start of cooling. The very short data collection times required by SAXS compared with, e.g., solution NMR will be key to collecting data—and obtaining structural information—from supercooled liquid samples at low temperatures before appreciable ice forms. This could also provide a method for understanding the origin of differences in conformation that may be observed in SAXS profiles of biomolecules at 300 K and 100 K when cooling rates are insufficient to trap the 300 K biomolecular envelope.

Preferred Method of Use

The SAXS sample cells and sample cell arrays of the present invention have several possible methods of use. The sample cells can be filled with buffer solutions and with buffer+biomolecule solutions using standard gel-loading pipette tips (for larger diameter cells) and with syringe needles, either using manual pipetters and syringes or using automated liquid handlers. To facilitate handling and filling, the sample cell arrays, inserted into standard goniometer bases, can be placed in a holder having the SBS format used by liquid handlers. In all cases, the cells must be carefully filled so that there are no bubbles along the X-ray beam path. This can be achieved by inserting the tip all the way to the bottom of the cell and filling from the bottom up, or by injecting liquid with some pressure and forcing bubbles out through the radial channels in the sealing ring. The cells should be slightly overfilled.

Once the cells are filled, the spacer layer can be placed over the cells (if it is not already in place against the bottom wafer/substrate of the array, and then the top wafer/substrate containing the sealing caps is placed on top of the cells and pushed down onto them, forcing excess liquid through the radial channels in the cap.

The samples thus prepared can be cooled by plunging the array into liquid nitrogen by hand or by using an automated plunge cooler; or by inserting the sample into a cold gas stream. If the samples are cooled to below the solution's glass transition temperature, they can be placed in standard cryovials or in multiple-sample "pucks" used in cryocrystallography, stored in liquid nitrogen or in a dry cryogenic shipper, and then transported to the X-ray source for SAXS measurements. If the samples are cooled to a temperature where the solution remains liquid, then sample cell filling and cooling should be performed at the X-ray source and SAXS data collection commenced as soon as possible after filling.

At the X-ray source, the goniometer base containing the sample cell array can be placed on a standard magnetic goniometer head, either using a using a robotic sample changer or manually. If the samples are to be cooled in place, the cold gas cryostream can be set to the desired sample temperature while its path to the sample is blocked using a shutter. The shutter can then be opened and the sample rapidly cooled to the desired temperature. If the samples have been previously cryocooled and stored in liquid nitrogen, then can be transferred to the goniometer head using a robotic sample changer or using cold cryotongs. The array position can then be stepped to place each cell in the array in the X-ray beam for data collection. To minimize the risk of frosting and ice formation, the sample cell array should be surrounded by dry gas at all times during data collection.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as, "has" and "having"), "include" (and any form of include, such as "includes" and "including"), and "contain" (any form of contain, such as "contains" and "containing") are open-ended linking verbs. As a result, a method or device that "comprises", "has", "includes" or "contains" one or more steps or elements. Likewise, a step of method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts and equivalents of all means or step plus function elements in the claims below, if any, are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the present invention for various embodiments with various modifications as are suited to the particular use contemplated.

What is claimed is:

1. A cryogenic, small angle X-ray scattering (SAXS) application sample holder, comprising:
    a sample cell having a top portion, a base portion, and a chamber comprising a wall extending between the top portion and the base portion and disposed on the base portion, the top portion, the base portion, and the chamber together defining an interior volume;
    wherein each of the base portion, the top portion, and the chamber are structured and configured to directly contact a liquid sample disposed in the interior volume when in use;
    wherein the chamber wall comprises an elastically compliant wall configured to deflect inwardly in response to stresses caused by thermal contraction of the sample upon cooling, thereby reducing the interior volume of the chamber, and wherein a volume contraction of the chamber upon cooling is between 1% and 20%.

2. The sample holder of claim 1, wherein the top portion comprises a sealing cap and a first X-ray transparent window.

3. The sample holder of claim 1, wherein the chamber wall defines a cylindrical tube having a liquid volume capacity of 0.001 to 10 microliters.

4. The sample holder of claim 1, wherein the top portion is movable up and down along an axis of the chamber to accommodate thermal expansion or contraction of the sample.

5. The sample holder of claim 1, further comprising;
    a second sample cell and a spacer, wherein the top portion comprises a first X-ray transparent window, wherein the bottom portion comprises a second X-ray transparent window, and wherein the spacer is configured to define a minimum distance between the first X-ray transparent window of the top portion and the second X-ray transparent window of the base portion in each sample cell.

6. The sample holder of claim 1, wherein the sample holder has a fixed path length.

7. The sample holder of claim 1, wherein a diameter of the chamber is between 100 microns and 2 mm.

8. The sample holder of claim 1, wherein the elastically compliant wall comprises a compliant material including polymer selected from at least one of: polyethylene terephthalate, polyimide, SU-X, or PDMS, and wherein the polymer is configured to easily deflect when force is applied.

9. The sample holder of claim 1, wherein a diameter of the chamber is at least 3 times of a diameter of X-ray beams.

10. The sample holder of claim 1, wherein the elastically compliant wall of the chamber has a thickness between 10 to 100 microns.

11. The sample holder of claim 2, wherein the base portion further comprises a second X-ray transparent window in alignment with at least a portion of the first X-ray transparent window.

12. The sample holder of claim 11, wherein the first and second X-ray transparent windows are composed of at least one of: silicon nitride, polyimide, graphene, mica, a biaxially-oriented polyethylene terephthalate, and polypropylene.

13. The sample holder of claim 3, wherein the top portion further comprises a sealing ring configured to slide over a top end of the cylindrical tube to hold the sample within the interior volume of the chamber.

14. The sample holder of claim 13, wherein the sealing ring comprises one or more radial channels extending through the sealing ring to the interior volume of the chamber, and wherein the one or more radial channels are in fluid communication with the inner volume of the chamber.

15. The sample holder of claim 13, wherein the top portion comprises an X-ray transparent window, and wherein the sealing ring comprises a lip configured to separate the cylindrical tube from the X-ray transparent window of the top portion.

16. The sample holder of claim 14, wherein a width of each of the one or more radial channels is 100 micrometers or less.

17. The sample holder of claim 5, wherein the spacer is composed of at least one of silicon and silicon dioxide.

18. The sample holder of claim 5, further comprising a tapered end attached to the base portion of the second sample cell.

19. A cryogenic, small angle X-ray scattering (SAXS) application sample holder, comprising:

a sample cell having a top portion, a base portion, and a chamber comprising a wall extending between the top portion and the base portion, wherein the chamber is disposed on the base portion and wherein the top portion, the base portion, and the chamber together define an interior volume;

a first window within the base portion;

a second window within the top portion and positioned such that at least a portion of the second window is in alignment with the first window; and a ring removably attached over at least a portion of the chamber, the ring having two or more radial channels extending through the ring to the inner volume of the chamber;

wherein each of the two or more radial channels are in fluid communication with the inner volume of the chamber.

20. The sample holder of claim 19, wherein the chamber wall comprises an elastically compliant wall configured to deflect inwardly in response to stresses caused by thermal contraction of the sample upon cooling, thereby reducing the interior volume of the chamber.

21. The sample holder of claim 20, wherein the elastically compliant wall is configured to deflect inwardly to produce a volume contraction of the interior volume of the chamber upon cooling of between 1% and 20%.

22. The sample holder of claim 20, wherein the elastically compliant wall is configured to deflect inwardly to produce a volume contraction of the interior volume of the chamber upon cooling of between 5% and 20%.

* * * * *